United States Patent [19]
del Valle

[11] 4,234,556
[45] Nov. 18, 1980

[54] METHOD OF PRODUCING CALCIUM BROMIDE

[75] Inventor: Clara J. del Valle, Midland, Mich.

[73] Assignee: The Dow Chemical Company, Midland, Mich.

[21] Appl. No.: 83,051

[22] Filed: Oct. 5, 1979

Related U.S. Application Data

[63] Continuation of Ser. No. 817,938, Jul. 22, 1977, abandoned.

[51] Int. Cl.³ .............................................. C01F 11/34
[52] U.S. Cl. ................................... 423/497; 166/278; 175/65
[58] Field of Search ...................... 423/497, 438, 240; 166/244 C, 278; 175/65

[56] References Cited

U.S. PATENT DOCUMENTS

| 2,801,697 | 8/1957 | Rohrback | 166/244 C |
| 4,051,901 | 10/1977 | Sarem et al. | 166/244 C |
| 4,083,942 | 4/1977 | Sanders | 423/497 |

FOREIGN PATENT DOCUMENTS 327867  10/1920  Fed. Rep. of Germany ........... 423/497

OTHER PUBLICATIONS

Bailar et al., "Comprehensive Inorganic Chemistry", Pergamm Press, N.Y., 1973, pp. 633, 634.
Mellor, "A Comprehensive Treatise on Inorganic & Theoretical Chemistry", Longmans, Green & Co., N.Y., vol. 3 (1923), pp. 725–726.
Masterson et al., "Chemical Principles", 1969, pp. 425, 459–460, 470.
Sienko et al., "Chemistry", 1961, pp. 211–215.
Skoog et al., "Fundamentals of Analytical Chemistry", 1963, pp. 245–247.

Primary Examiner—Earl C. Thomas
Attorney, Agent, or Firm—J. M. Kuszaj; C. J. Enright

[57] ABSTRACT

An improved method for producing calcium bromide by reacting hydrogen bromide with calcium hydroxide in the presence of water and carbonate ions is disclosed. The improvement comprises maintaining a sufficient pH in the reaction mixture to convert at least a portion of the carbonate ions to a gaseous carbon-oxygen compound thereby removing the carbonate ions from the reaction mixture.

10 Claims, No Drawings

METHOD OF PRODUCING CALCIUM BROMIDE

CROSS-REFERENCE TO RELATED APPLICATION

This is a continuation of application Ser. No. 817,938, filed July 22, 1977, and now abandoned.

BACKGROUND OF THE INVENTION

The present invention relates generally to the production of calcium bromide, and more in particular to an improved method for producing substantially solids-free calcium bromide solutions.

Aqueous solutions of calcium bromide have found extensive commercial application as well pack and completion fluids in the oil and gas production industry. In drilling deep, high pressure wells, it has been shown that the permeability of the well can be reduced or destroyed by perforating with fluids containing suspended solids. Consequently, it is desirable to produce a high density calcium bromide product with a minimal amount of solids suspended therein.

Typically, solutions of calcium bromide have been prepared by the reaction of an aqueous solution of calcium hydroxide with stoichiometric amounts of gaseous hydrogen bromide. However, this reaction often results in the post precipitation or settling of solids within the calcium bromide solution. Theses solids have now been identified as carbonate ions originally present in the calcium hydroxide as impurities.

An improved method for producing aqueous solutions of calcium bromide which substantially eliminates the precipitation of unwanted solid carbonate material in the calcium bromide solution has been discovered.

SUMMARY OF THE INVENTION

The present invention is an improved method for producing calcium bromide by reacting hydrogen bromide with calcium hydroxide in the presence of water and carbonate ions. The improved process comprises maintaining a sufficient pH in the reaction mixture to convert at least a portion of the carbonate ions to a gaseous carbon-oxygen compound thereby removing the carbonate ions from the reaction mixture.

DESCRIPTION OF THE PREFERRED EMBODIMENT

In practicing the improvement of the present invention, gaseous hydrogen bromide is reacted with calcium hydroxide in the presence of water according to the following reaction:

$$Ca(OH)_2 + H_2O + 2HBr \rightarrow CaBr_2 + 3H_2O. \qquad I$$

Calcium carbonate is present in the calcium hydroxide as an impurity, and generally precipitates from the calcium bromide solution upon standing.

It has now been discovered that the amount of carbonate ions present in the calcium bromide solution can be controlled by maintaining a sufficient pH in the reaction mixture to convert at least a portion of the carbonate ions to carbon dioxide, which is then expelled from the solution. A pH of from about 1 to about 3 has been found to eliminate substantially all of the carbonate ions, and is preferred.

The pH of the reaction mixture is maintained at the proper level by the controlled addition of a suitable mineral acid such as HCl, $H_2SO_4$, HBr and the like. However, it is preferred to maintain the pH of the reaction mixture by controlling the amount of hydrogen bromide introduced into the reaction. By adding a stoichiometric excess of hydrogen bromide, the pH of the reaction mixture can be adjusted to the proper level without the introduction of additional anions associated with other acids.

In embodiments where the solution of calcium bromide is to be employed as a well completion fluid, the pH of the solution should be readjusted from an acidic level to a neutral or slightly basic level to avoid excessive corrosion of well tubing. This can be done by adding a measured amount of an aqueous solution of calcium hydroxide to the reaction mixture. Readjustment of the reaction mixture to a pH level of from about 7 to about 8, has been found to produce a satisfactory well completion fluid.

The reintroduction of calcium hydroxide to readjust the pH can also introduce solid impurities into the reaction mixture. Therefore, the reaction mixture should be filtered through a suitable porous barrier, such as polypropylene cloth, at a temperature sufficient to maintain the integrity of the porous barrier, but less than the temperature at which calcium bromide boils. In one embodiment the reaction mixture is filtered through a polypropylene cloth at a temperature of less than 80° C. In other embodiments the reaction mixture can be filtered through a polypropylene cloth at a temperature of from 20° to about 60° C., or at a temperature of from about 20° to about 30° C. If desired, the filtering efficiency can be increased by preparing a solid filter cake made with a suitable filter aid, such as diatomaceous earth, pearlite, magnesia, or the like. The porous barrier is then coated with this cake prior to filtering.

The calcium bromide solution recovered following filtration is a substantially solids-free aqueous solution of calcium bromide. For use as a well completion fluid it is preferred that the solution contain from about 50 to about 55 percent by weight calcium bromide and have a density of about 14.2 pounds per gallon.

The practice of the present invention is further illustrated in the following examples.

EXAMPLE 1

An aqueous solution of calcium hydroxide containing about 34 percent by weight calcium hydroxide was added to a suitable container and stirred by mechanical means until a homogeneous solution was formed. Gaseous hydrogen bromine was bubbled into the calcium hydroxide solution at a rate of from about 3 to about 4 grams per minute. The pH level of the resulting reaction mixture was continuously monitored by withdrawing 1 milliliter (ml) of reaction mixture, diluting it with 10 mls of water, and then measuring the pH with a pH meter.

Sufficient gaseous hydrogen bromide was metered into the calcium hydroxide solution to achieve a pH of about 2.2. No carbonate solids were observed. The reaction mixture was then agitated by mechanical means at 60° C. for about 12 hours. Additional amounts of the 34 percent by weight calcium hydroxide solution were reintroduced into the reaction mixture to adjust the pH level of the solution to about 7.8. The resulting mixture was filtered at 25° C. using a Buchner funnel and a single layer of polyethylene cloth. The resulting solution contained about 53 percent by weight calcium bromide. The solution was clear and colorless and contained no carbonate solids.

Example 2

An aqueous solution of calcium hydroxide was reacted with gaseous hydrogen bromide substantially as described in Example 1. However, pH of the reaction mixture was adjusted to 3.0 by the addition of hydrogen bromide gas. The resulting calcium bromide solution was clear, solids-free, and colorless.

Comparative Tests A–C

Aqueous solutions of calcium hydroxide were reacted with gaseous hydrogen bromide substantially as described in Example 1. However, the pH of the reaction mixture was maintained at a pH of 7.0, 6.5 and 7.7, respectively. The resulting solutions of calcium bromide were contaminated with carbonate solids.

What is claimed is:

1. In the method of producing calcium bromide wherein hydrogen bromide is reacted with calcium hydroxide in the presence of water and carbonates, the improvement comprising acidifying the reaction mixture to a pH of from about 1 to about 3, and maintaining such pH range for a sufficient time to convert at least a portion of the carbonates to carbon dioxide, thereby removing carbonates from the reaction mixture.

2. The method of claim 1 wherein the reaction mixture is acidified by addition of a mineral acid.

3. The method of claim 2 wherein the mineral acid is hydrogen bromide.

4. The method of claim 3 wherein the hydrogen bromide is a gas.

5. The method of claim 1 wherein the pH in the reaction mixture is maintained by addition of a stoichiometric excess of hydrogen bromide.

6. The method of claim 1 including the additional steps of basifying the reaction mixture to a pH of from about 7 to about 8.

7. The method of claim 1 including the additional steps of basifying the reaction mixture to a pH of from about 7 to about 8 and filtering said reaction mixture to remove solid impurities.

8. In a method for producing calcium bromide solution wherein hydrogen bromide is reacted with calcium hydroxide in the presence of water and carbonates, the improvement comprising:
   (a) acidifying the reaction mixture to a pH of from about 1 to about 3;
   (b) maintaining such pH range for a sufficient time to convert at least a portion of the carbonates to carbon dioxide, thereby removing at least a portion of the carbonates from the reaction mixture;
   (c) adding sufficient calcium hydroxide to readjust the pH of the reaction mixture from an acidic level to a neutral to a slightly basic level to produce a substantially solids free calcium bromide solution.

9. The method of claim 8 including the additional step:
   (d) filtering said reaction mixture to remove solid impurities.

10. The method of claim 8 wherein the neutral to slightly basic level comprises a pH of from about 7 to about 8.

* * * * *